(No Model.) 2 Sheets—Sheet 1.

W. WOODWARD & J. GEISLER.
CLOTHES LINE REEL.

No. 532,130. Patented Jan. 8, 1895.

Witnesses:
Julia M. Bristol.
Nellie McKibben

Inventors
William Woodward and John Geisler
by Bond, Adams, Pickard & Jackson Attys (No Model.) 2 Sheets—Sheet 2.
W. WOODWARD & J. GEISLER.
CLOTHES LINE REEL.
No. 532,130. Patented Jan. 8, 1895.
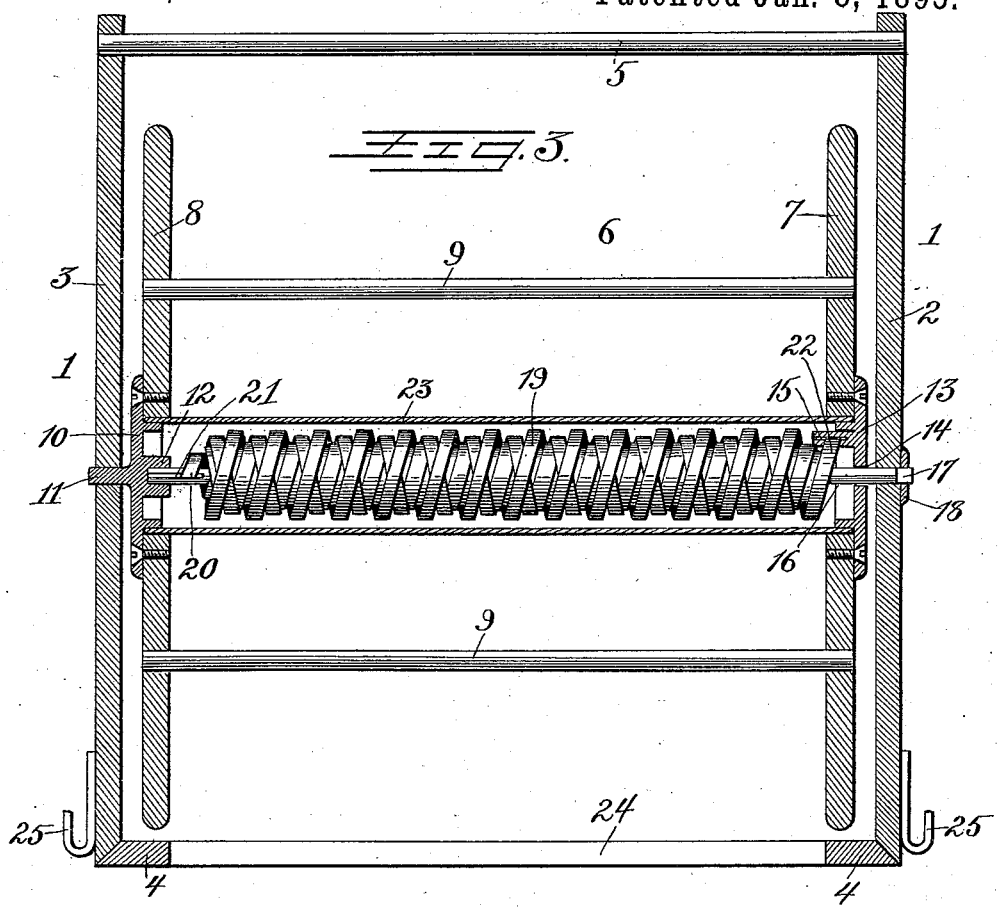
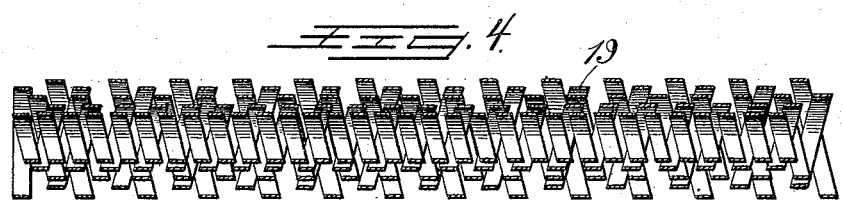
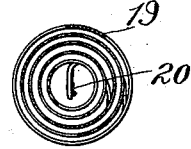
Witnesses:
Julia M. Bristol
Nellie McKibben
Inventors
William Woodward and
John Geisler
by Bond, Adams, Pickard & Jackson
Attorneys

UNITED STATES PATENT OFFICE.

WILLIAM WOODWARD AND JOHN GEISLER, OF CHICAGO, ILLINOIS.

CLOTHES-LINE REEL.

SPECIFICATION forming part of Letters Patent No. 532,130, dated January 8, 1895.

Application filed July 31, 1893. Serial No. 482,027. (No model.)

*To all whom it may concern:*

Be it known that we, WILLIAM WOODWARD and JOHN GEISLER, citizens of the United States, residing at the city of Chicago, county of Cook, and State of Illinois, have invented certain new and useful Improvements in Clothes-Line Reels, of which the following is a specification, reference being had to the accompanying drawings, in which—

Figure 1:
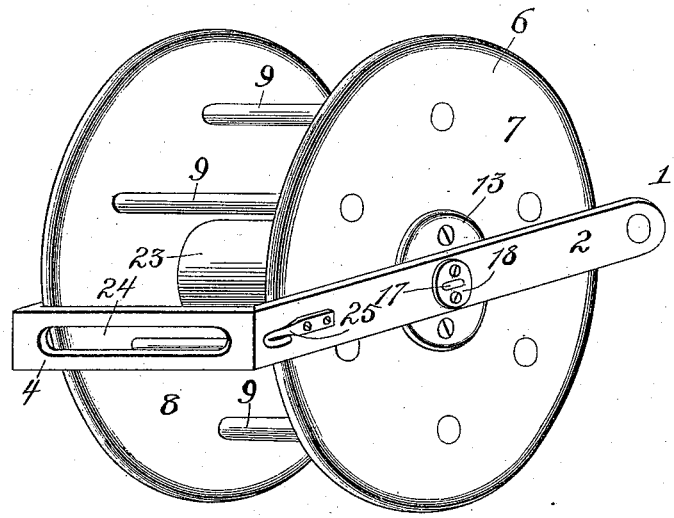
Figure 2:
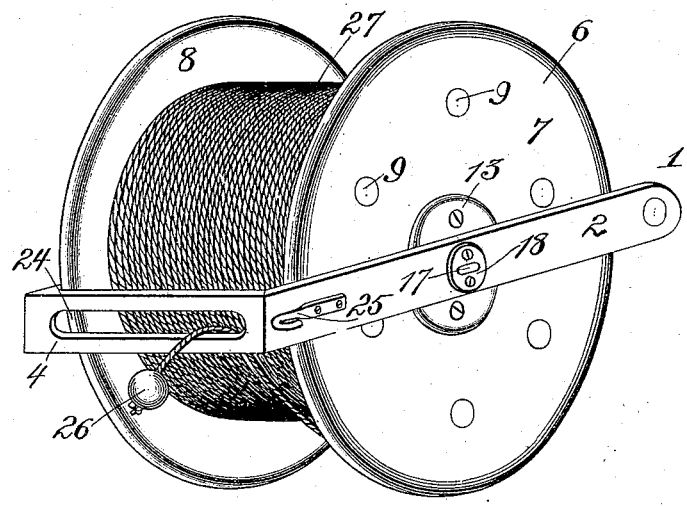

Figure 1 is a perspective view of our device. Fig. 2 is a perspective view showing the clothes-line wound upon the reel. Fig. 3 is an enlarged detail, being a cross section through the reel and frame. Fig. 4 is an enlarged detail, being a longitudinal section of the spring; and Fig. 5 is an enlarged detail, being an end view of the spring.

Our invention relates to clothes-line reels, and its object is to provide a reel with new and improved means, whereby a line of considerable length can be automatically wound up.

The invention also has for its object to provide a new and improved device which is light, compact, convenient, and easily carried from place to place, so that the line can be readily strung upon posts or other supports.

To accomplish these objects our invention consists in the features of construction and the combination or arrangement of parts hereinafter described and claimed.

In the drawings, 1 indicates a frame, which consists of two side bars 2—3, an end piece 4, and a cross piece or handle-bar 5.

6 indicates the reel, which is provided with end disks 7—8 and cross bars 9.

10 indicates a cap, which is centrally secured upon the outer surface of the disk 8 and is provided with a pivot 11, which is journaled in the side bar 3 of the frame 1. The disk 10 is provided on its inner surface with a socket 12, the opening of which corresponds with the line of the pivot 11 and with the axial line of the reel.

13 indicates a cap which is centrally secured upon the outer surface of the disk 7, and is provided at its center with a circular opening 14 upon the axial line of the pivot 11 and of the reel 6.

15 indicates a slotted stud or projection upon the inner surface of the cap 13 for the purpose of securing one end of the spring, as hereinafter described.

16 indicates an arbor, one end of which is journaled in the socket 12 of the disk 10, and the other passes through the circular opening 14 of the cap 13 so that the reel may rotate thereon. The outer end 17 of said arbor 16 is squared or flattened, and passes through the side bar 2 of the frame 1.

18 indicates a cap which is secured upon the outer side of said side bar 2 of the frame 1, and is provided with an opening into which the flattened end 17 of the arbor 16 fits.

19 indicates a flat coiled spring, which is wound around the arbor 16 in several layers, each layer crossing the one below at an angle, as is best shown in Figs. 3 and 4, whereby a spring of great length and power is provided in a comparatively short and narrow space. The end 20 of the inner coil of said spring is passed through a slot 21 of the arbor 16 and secured therein by being bent around said arbor. The end 22 of the outer layer of said spring is secured in the slotted stud or projection 15 of the cap 13, as is best shown in Fig. 3. The length of said spring and the number of coils will depend upon the length of the line for which the reel is to be used, and will of course vary with different sizes, so as to allow different lengths of clothes-lines to be used.

23 indicates a hollow cylinder of metal or other suitable material, which is secured between the disks 7—8 surrounding the spring and arbor so as to protect the same from wet and rust.

The end bar 4 of the frame 1 is provided with a slot 24 through which the end of the line may pass, as is best shown in Fig. 2.

25 indicates hooks, which are secured to the side bars 2—3 for the purpose of hooking upon the line when the line is hung up upon supports, so that the reel may be hung up away from the ground.

26 indicates a knob or button which is secured upon the outer end of the clothes-line.

The clothes-line 27 is secured to one of the cross bars 9, and is wound upon said bars in such length as may be desired, the free end being passed through the slot 24 in the bar 4 and being provided with the button 26 to prevent its being drawn through said slot 24.

When it is desired to use the line, the outer end is secured to a post or such other support as it may be desired to hang the line upon, and the reel is taken by the frame and carried to the next support, unwinding the line from the reel. As the line is unwound from the reel it rotates the disks 7—8, but inasmuch as the spring is secured in the slot 21 of the arbor 16 and in the slotted projection 15 of the cap 13, and the flattened end of the arbor fitted into the opening in the plate 18 prevents the arbor from rotating,—the spring will be coiled tighter as the reel is rotated by the unwinding of the line. When the line is thus carried to the next support it is wound around or secured to that in any suitable manner, and carried in the same manner to the next support, until sufficient length of line is strung up. When the line is secured to the last support the reel is hung up by hooking it over the line by the hooks 25.

When it is desired to take the line down, the process of hanging it up is reversed; the uncoiling of the spring, which, as described, has been coiled tighter by the unwinding of the rope, causing the reel to rotate and wind the line upon it.

By constructing the spring in the manner described, so that it is coiled in several layers which cross one another at an angle, we provide a great length of spring, and enable a line of considerable length to be practicably wound upon the reel.

That which we claim as our invention, and desire to secure by Letters Patent, is—

1. A line-reel, consisting of a frame composed of side bars 2 and 3, an end piece 4, and a handle-bar 5, a rotatable reel composed of heads 7 and 8 and cross-bars 9, a cap 10 carried by one of the reel heads and having a pivot 11 journaled in one of the side bars of the frame, a shaft 16 secured at one end to the other side bar of the frame and at the opposite end inserted into the pivot-carrying cap, a cap 13 journaled on the shaft and carried by the reel, and a spring coiled about the shaft in a plurality of superimposed layers, each layer crossing the one below it at an angle, one end of the spring being secured to the cap 13, and the other end secured to the shaft 16, substantially as described.

2. A line-reel, consisting of a frame composed of side bars 2 and 3, an end piece 4, and a handle-bar 5, a reel composed of heads 7 and 8 and cross-bars 9, a cap 10 carried by one of the reel-heads and having a pivot 11 journaled in one of the side bars of the frame, a shaft 16 secured at one end to the other side bar of the frame, and at the opposite end inserted into the pivot-carrying cap, a cap 13 journaled on the shaft, carried by the reel and having an inwardly projecting slotted stud 15, and a spring coiled around the shaft and having one end secured to the said slotted stud and the other end to said shaft, substantially as described.

WILLIAM WOODWARD.
JOHN GEISLER.

Witnesses:
C. W. BALLINGER,
W. H. BOYD.